United States Patent [19]
Ewert

[11] 4,375,113
[45] Mar. 1, 1983

[54] BEEHIVE SUPERSTRUCTURE TRANSPORT APPARATUS

[76] Inventor: Edna A. Ewert, 1145 E. Sixth, Fremont, Nebr. 68025

[21] Appl. No.: 264,474

[22] Filed: May 18, 1981

[51] Int. Cl.³ .............................................. A01K 59/00
[52] U.S. Cl. .................................... 6/12 R; 280/47.24
[58] Field of Search ............................... 6/12 R, 12 M; 280/47.24, 47.34, 63

[56] References Cited

U.S. PATENT DOCUMENTS

| | | | |
|---|---|---|---|
| 2,108,480 | 2/1938 | Foster | 6/12 R X |
| 3,035,847 | 5/1962 | Born | 280/47.24 X |
| 3,854,747 | 12/1974 | Johnston | 280/47.24 X |

FOREIGN PATENT DOCUMENTS

| | | | |
|---|---|---|---|
| 668717 | 11/1929 | France | 280/47.24 |
| 60474 | 1/1948 | Netherlands | 280/47.24 |
| 638400 | 6/1950 | United Kingdom | 280/47.24 |

*Primary Examiner*—Robert P. Swiatek
*Attorney, Agent, or Firm*—Harry M. Weiss

[57] ABSTRACT

A beehive super transportation apparatus which incorporates opposed lifting fingers adjustably coupled to a wheel-supported frame which is disposed to support the fingers as they sequentially engage opposed edges of the super, to serve as a device to lift the super one end at a time from the hive as a handle coupled to the frame is shifted to pivot the frame about the wheel support, so that a single person can lift and carry a honey-filled super from a hive without either undue strain or bodily contact with the hive body or the super.

9 Claims, 3 Drawing Figures

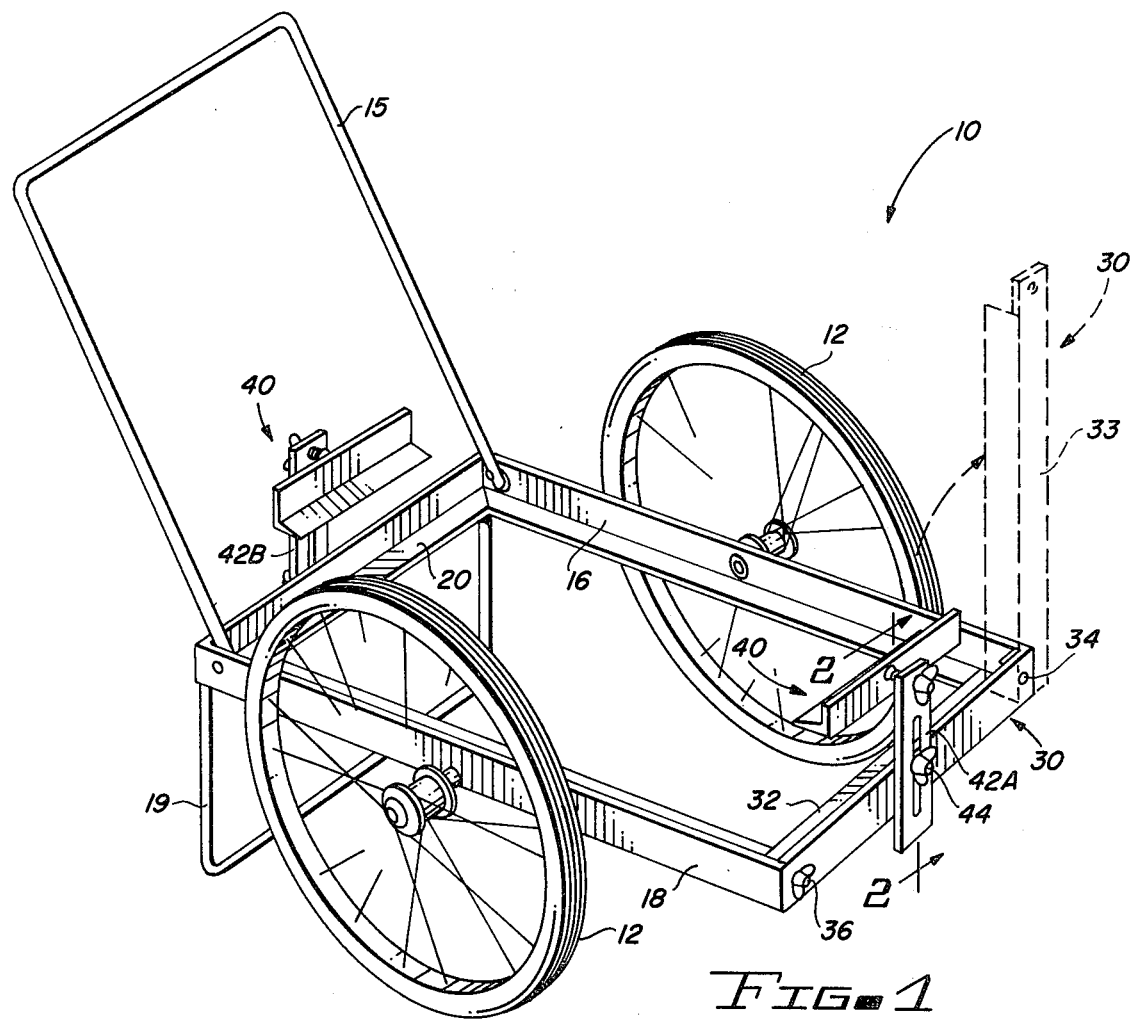
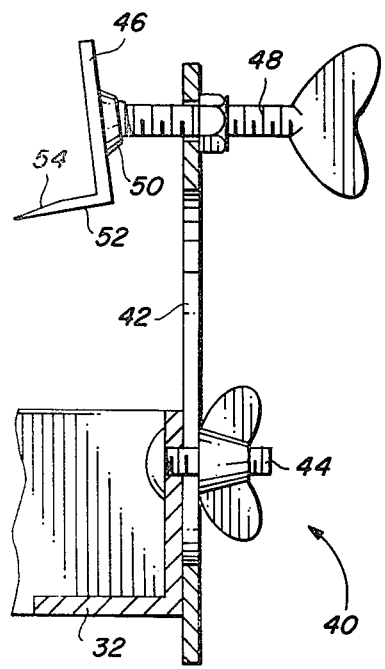
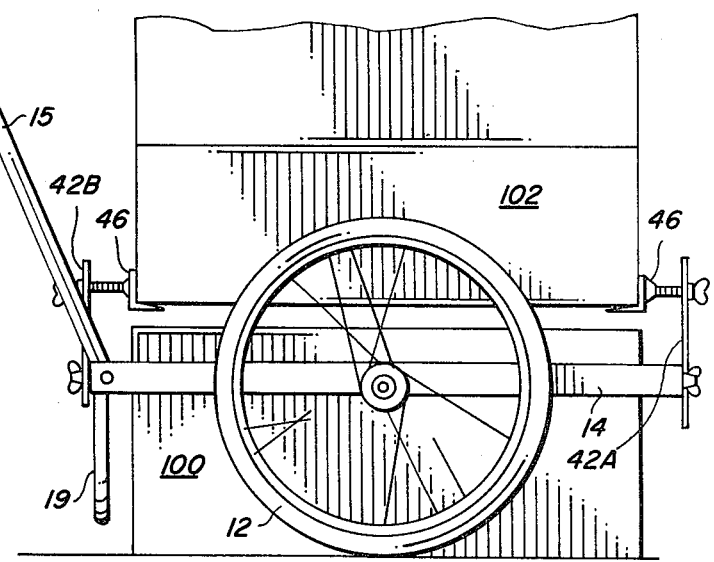

BEEHIVE SUPERSTRUCTURE TRANSPORT APPARATUS

BACKGROUND OF THE INVENTION

1. Field of the Invention

This invention relates generally to beekeeping, and, more specifically, to a device to enable a person to readily remove, transport and replace a superstructure, or super, from a beehive, even when the super is fully loaded with honey.

2. Description of the Prior Art

In the past, honey has been widely utilized as a sweetener from time immemorial. Raising bees for honey production, or beekeeping, has developed as a source of food, an entertaining hobby, and income generating activity. To provide a ready recovery of honey and wax produced by a hive of bees, fabricated hives with regular surfaces have been developed. The hives typically utilized a stacked series of enclosures, with the lowermost being referred to as a hive body, and the anterior supers being capped with a hive cover. A wax starter comb was secured to the interior surface of the hive body, one or more supers were stacked atop the hive body, and the bees were introduced into the hive. The bees preferred to live in the hive body, but stored the excess honey which they produced in the supers. Thus to recover the honey, a beekeeper had only to lift the supers from the hive and install a stack of clear supers, with a fresh starter comb, atop the hive-proper to allow the bees to continue their honey-making.

However, the honey laden supers typically weighed from 25 to 75 pounds. While the weight of such a load was within the lifting capacity of most people, a beekeeper working alone had to fully grasp the super with the arms, and compress the super against the body to permit sufficent exertion to be applied to lift the honey-laden super from the hive. The need to grasp the hive was accentuated by the bee glue which the bees collected and applied to seal the hive into a unitary structure. Such a lifting approach, however, presented a problem, in that inadvertent compression of a bee between the body and the super being lifted, as often occured, resulted in at least one, and more often several, painful stings from the offended bee or bees.

While the weight of a single super was well within the lifting capcity of two people, a substantial problem was presented when a single person had to lift the super or supers from a hive while holding the super at a distance from the body. Since a super was typically about a foot in width, by two feet in length, it was necessary to grasp opposed sides or corners to lift the super. With the hands shifted to such a distance from the body of the beekeeper, the lifting leverage was severely reduced. It was particularly difficult to lift the hive without using the trunk of the beekeeper to provide a third support and balance point for the load. The problem was even more acute where the beekeeper was elderly, or not particularly athletically inclined.

A need existed for an apparatus or method to permit a person to readily lift one or more supers from a beehive, and an even more specific need existed for an apparatus or method to permit a beekeeper working alone to lift one or more supers from a hive without assistance and without bodily grabbing the super to wrest it from the hive.

BRIEF DESCRIPTION OF THE DRAWING

FIG. 1 is a perspective view of a beehive superstructure transport apparatus.

FIG. 2 is an enlarged sectional detail along line 2—2 of FIG. 1.

FIG. 3 is a side elevational view of the super transport apparatus in use.

SUMMARY OF THE INVENTION

In accordance with one embodiment of the invention, it is an object to provide a portable, low-cost apparatus to facilitate lifting and carrying a super from a beehive.

It is another object to provide an apparatus for placing a super atop a beehive.

It is a further object to teach a method of lifting a super from a beehive without bodily contacting the super.

It is again another object to teach a method of transporting a beehive super without bodily contacting the super.

It is a further object to provide an apparatus to easily break the bee-glue seal between the hive body and a super.

DESCRIPTION OF THE PREFERRED EMBODIMENTS

In accord with a first embodiment of the invention, a transport apparatus for lifting and carrying a super from a hive body is disclosed, comprising: frame means having a base and first and second legs projecting therefrom for flanking the super; wheel means having wheels coupled to the first and second legs for rotatably supporting the frame means; gate means having a beam releasably connected between the first and second legs for connecting the cantilevered ends of the frame means so that the first and second legs can be rolled aside the super; and shelf means for engaging opposed end of the super so that the frame can be rocked upon the wheels to lift the super.

In accord with another embodiment of the invention, a method of transporting a super from a beehive is disclosed, comprising the steps of: rolling a wheel supported u-shaped frame about the beehive; tilting the frame forward about the wheels; coupling a first angle shelf to the gate; driving a projecting leg of the first angle shelf between the hive and the super; tilting the frame backward about the wheels to lift a first end of the super from the hive.

The foregoing and other objects, features and advantages of this invention will be apparent from the following more particular description of the preferred embodiments of the invention as illustrated in the accompanying drawings.

THE SPECIFICATION

In FIG. 1, a perspective view of a beehive superstructure, or super, lifting and transport apparatus is shown generally by reference number 10. Wheels 12 are rotatably supported from a frame 14. The frame has a handle 15, allowing the frame 14 to be steered and pivoted about the wheels 12. A gate mechanism, as shown generally by reference number 30, forms one end of the frame 14. The gate mechanism 30 has a beam 32 pivotally coupled to a first leg 16 of the frame 14 about a pivot axle 34. The opposed end of the beam 32 is releasably supported by, and secured to, a second leg 18 of the frame 14 by a latch 36. A rest 19 is attached to the trailing end of the frame 14 to provide stable support when the handle 15 is released.

Base 20 of the frame 14 and the pivoting beam 32 each support a vertically-adjustable finger apparatus, as shown generally by reference number 40. The vertical support for the finger apparatus 40 is a slotted bracket 42 releasably attached to the supporting member 20 or 32 by a fastener 44.

Referring then to FIG. 2, a sectional view of the finger apparatus 40 taken along line 2—2 of FIG. 1 is shown. A shelf angle 46 is connected to the bracket 42 by a laterally adjustable connection, which includes a shaft 48 threadedly secured to the bracket and a swivel 50, which permits the shelf angle 46 to rotate about the shaft 48. The lower leg 52 of the shelf angle 46 has a sharpened leading edge 54.

In use, as illustrated in FIG. 3, the super transport apparatus 10 is first opened by release of the latch 36 and pivoting of the beam 32 upward to the position shown by reference number 33 in FIG. 1. A beekeeper then propels the lifting apparatus 10 forward until the legs 16, 18 of the frame 14 flank a hive body 100, with one or more supers 102 resting thereon. The beam 32 is then pivoted downward and the latch 36 re-engaged, bringing one of the shelf angles 46 to rest adjacent each of the opposed ends of the super 102 and thereby girding the hive within frame 14.

The fasteners 44 are released and the slotted brackets 42 are adjusted, to account for variations in the contour of the surface upon which the wheels 12 rest, to bring the outer leg 52 of each of the angle shelves 46 into registry with the plane formed by the juncture between the hive body 100 and the immediately adjacent one of the supers 102. While the number of supers 102 atop a hive body 100 may vary, the hive body 100 is always a single structure, so that the vertical adjustment required of the slotted bracket 42 need only cover a limited range. The shaft 48 is then threaded forward to drive and wedge the sharpened edge 54 of the shelf angle 46 between the hive body 100 and the super 102, breaking the bee glue seal between the hive body 100 and the super 102. Alternatively, the edge 54 can be positioned adjacent the juncture between the hive body 100 and the super 102, and the transport apparatus 10 rolled backward to drive the edge therebetween.

With the shelf angles 46 fully driven against the super 102, the super is easily lifted by releasing the slotted bracket 42, elevating the handle 15 to tilt the frame 14 forward several degrees and resecuring the front slotted bracket, as identified by reference number 42A. As the handle 15 is depressed, the lever arm formed about the axis of the wheels increases the applied force and permits the bee glue seal between the hive body 100 and the super 102 to be fully broken as one end of the super 102 is pivoted upward. The handle 15 and the trailing end portion of the frame 14 are then lowered, the rear slotted bracket as identified by reference number 42B is secured, the edge 54 of the rear shelf angle 46 is driven between the hive body 100 and the super 102 by rotating the shaft 48, the bracket 42B is secured, and the handle 15 shifted to a neutral position to lift the super 102, as shown in FIG. 3. The handle 15 is again depressed to tilt the frame backwards about the wheels until gate mechanism 30 clears the upper edge of the hive body 100. The stack of honey-laden supers 102 can then be easily wheeled to a remote site for service. After removal of the honey, the supers 102 are readily replaced by a reversal of the above steps.

While the invention has been particularly described and shown in reference to the preferred embodiments thereof, it will be understood by those skilled in the art that various changes in form and detail and omissions may be made therein without departing from the spirit and scope of the invention.

What is claimed is:

1. A transport apparatus for lifting and carrying a super from a hive body, comprising:
   frame means having a base and first and second legs projecting therefrom for flanking said super;
   wheel means having wheels coupled to said first and second legs for rotatably supporting said frame means;
   gate means having a beam releasably connected between said first and second legs for connecting the ends of said legs; and
   shelf means having first and second shelves coupled to opposed regions of said frame means for wedging between said super and said hive to break the seal therebetween and further for engaging opposing ends of said super.

2. A transport apparatus in accord with claim 1 wherein said shelf means comprises:
   an angle having a projecting leg;
   shaft means coupled to said angle and to said frame means for driving said angle in the direction of said projecting leg.

3. A transport apparatus in accord with claim 2 wherein said shaft means comprises:
   a shaft rotatably coupled to said angle;
   bracket means threadedly coupled to said shaft for permitting a location of said shaft to be vertically adjusted with respect to said frame means.

4. A transport apparatus in accord with claim 3 wherein said frame means further comprises a handle projecting above said frame means so that a person can readily manipulate said frame means upon said wheels.

5. A transport apparatus in accord with claim 4 wherein said shelf means further comprises said projecting leg having a sharpened outer edge so that the bee glue seal between said hive body and said super can be readily broken.

6. A transport apparatus in accord with claim 1, wherein:
   said gate means can be rolled aside said super; and
   said first shelf having a coupling to said beam and said second shelf having a coupling to said base so that said frame means can be rocked upon said wheels after said shelves have engaged said super to lift said super.

7. A method of transporting a super from a beehive, comprising the steps of:
   rolling a wheel supported u-shaped frame about said beehive;
   closing a gate coupled to said frame to gird said beehive within;
   tilting said frame forward about said wheels;
   coupling a first angle shelf to said gate;
   driving a projecting leg of said first angle shelf between said hive and said super;
   tilting said frame backward about said wheels to lift a first end of said super from said hive.

8. A method of transporting a super in accord with claim 7 further comprising the steps of:
   coupling a second angle shelf to a base of said frame at a location opposed to said gate;
   driving a projecting leg of said second angle shelf between said hive and said super; and
   tilting said frame forward about said wheels to lift the entirety of said super from said hive.

9. A method of transporting a super in accord with claim 7, further comprising the step of wheeling said frame to a remote site to service said super.

* * * * *